(12) United States Patent
Flisakowski et al.

(10) Patent No.: US 8,832,677 B2
(45) Date of Patent: *Sep. 9, 2014

(54) MANAGING DIGITAL CONTENT IN HIERARCHIES

(71) Applicant: Apple Inc., Cupertino, CA (US)

(72) Inventors: Shawn Patrick Flisakowski, Cupertino, CA (US); Keith Walter Rauenbuehler, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/072,327

(22) Filed: Nov. 5, 2013

(65) Prior Publication Data

US 2014/0059025 A1 Feb. 27, 2014

Related U.S. Application Data

(63) Continuation of application No. 12/609,995, filed on Oct. 30, 2009, now Pat. No. 8,694,985.

(51) Int. Cl.
*G06F 9/44* (2006.01)
*G06F 7/00* (2006.01)
*G06F 17/30* (2006.01)

(52) U.S. Cl.
CPC ...... *G06F 17/30244* (2013.01); *G06F 17/3028* (2013.01); *G06F 17/30256* (2013.01)
USPC ........... 717/170; 717/168; 707/609; 707/616; 707/641

(58) Field of Classification Search
None
See application file for complete search history.

(56) References Cited

U.S. PATENT DOCUMENTS

| | | | |
|---|---|---|---|
| 6,560,620 B1 * | 5/2003 | Ching | 715/229 |
| 6,993,539 B2 | 1/2006 | Federwisch | |
| 7,110,450 B1 | 9/2006 | Kimoto | |
| 8,156,459 B1 | 4/2012 | Ou | |
| 8,175,412 B2 | 5/2012 | Basri | |
| 8,255,360 B1 * | 8/2012 | Wallace et al. | 707/620 |
| 2003/0182308 A1 * | 9/2003 | Ernst et al. | 707/103 Z |
| 2005/0060401 A1 | 3/2005 | Brown | |
| 2005/0108280 A1 | 5/2005 | Kagle | |
| 2006/0031811 A1 * | 2/2006 | Ernst et al. | 717/100 |
| 2006/0070019 A1 * | 3/2006 | Vishnumurty et al. | 717/101 |
| 2006/0168510 A1 | 7/2006 | Bryar | |
| 2006/0251171 A1 * | 11/2006 | Murakami et al. | 375/240.16 |
| 2007/0185946 A1 | 8/2007 | Basri | |
| 2007/0283321 A1 * | 12/2007 | Hegde et al. | 717/110 |
| 2007/0294685 A1 * | 12/2007 | Oh | 717/168 |
| 2008/0122973 A1 | 5/2008 | Iwasaki | |
| 2009/0187610 A1 * | 7/2009 | Guo | 707/203 |
| 2009/0232216 A1 * | 9/2009 | Kurata | 375/240.16 |

* cited by examiner

*Primary Examiner* — Michael Sun
(74) *Attorney, Agent, or Firm* — Wong, Cabello, Lutsch, Rutherford & Brucculeri, LLP

(57) ABSTRACT

Methods, apparatuses, and systems for managing digital content in hierarchies are described. A first version of a digital image is received from an external device which tracks changes to the first version. It is determined that a second version of the digital image, changes to which have been tracked, exists. Based on comparing the tracked changes of both versions, the versions are combined. The first version is created by splitting the second version, which is stored in a master hierarchy, and transmitting the split version to the external device. During splitting, a child hierarchy of information is split from the master hierarchy, the child hierarchy including portions of the master hierarchy to access the second version such that the second version can be accessed independent of the master hierarchy. Changes to the versions are tracked in change tables, for example, using values that are mashed into a single record.

20 Claims, 11 Drawing Sheets

MANAGING DIGITAL CONTENT IN HIERARCHIES

TECHNICAL FIELD

This specification describes managing digital content, for example, digital images.

BACKGROUND

Many computer systems provide application software that enables users to manipulate (for example, view, edit, or otherwise access) digital content, for example, digital media items, such as, digital images, video, audio, data files, and the like. The digital content items can be stored in a hierarchical arrangement defined by a file structure. A typical hierarchical file structure includes a root directory (or equivalently, folder), which represents the highest level in the file structure's hierarchy. In general, the root folder can house three different types of objects: individual files (such as digital image files), pointers to objects, and folders (referred to as "sub-folders" or "sub-directories"). In addition to files and pointers, each sub-folder, in turn, can itself house sub-folders and so on with virtually any level of hierarchical nesting being possible. Each sub-folder represents the next lowest level in the file structure's hierarchy. A folder housing an object is said to be that object's "parent" folder. Conversely, an object in a folder is said to be a "child" of the folder in which it is housed.

SUMMARY

This specification describes technologies relating to managing, for example, splitting and combining digital content in hierarchies.

In general, one innovative aspect of the invention described here can be implemented as a computer-implemented method that includes receiving, by data processing apparatus, from an external device, a first version of a digital image and associated multiple first parameters including a collection of first features of the first version. Changes to the first features of the first version are tracked by the external device. It is determined by the data processing apparatus, that a second version of the digital image and associated multiple second parameters including a collection of second features of the second version exists. Changes to the second features of the second version have been tracked. In response to the receiving, tracked changes to the first features and tracked changes to the second features are compared by the data processing apparatus. Each tracked change to a feature is represented by a corresponding value. Tracked changes are represented by a collection of values. The first features of the first version and the second features of the second version are combined based on the comparing.

This, and other aspects, can include one or more of the following features. The tracked changes to the first version can be stored as corresponding first values in one or more rows. A row can include multiple values. The value representing a tracked change can be in hexadecimal format. The first version of the digital image can be stored in a hierarchical position in a master hierarchy. The multiple first parameters can be distributed across the master hierarchy. An input can be received to provide the first version and the associated multiple first parameters to the external device. In response to the receiving, a second version and the associated multiple second parameters identical to the first version and the associated multiple first parameters can be created. The first version and the associated multiple first parameters can be provided to the external device. The second version and the associated multiple second parameters can be retained.

The associated multiple second parameters of the second version can be distributed across the master hierarchy in a manner identical to that in which the associated multiple first parameters of the first version are distributed. Input can be received to transmit the first version of the digital image and the associated multiple first parameters to the external device. In response to the input, the first version of the digital image and the associated multiple first parameters can be provided to the external device. Providing the first version of the digital image and the associated multiple first parameters to the external device further can further include packaging the first version of the digital image and the associated multiple first parameters to be independently executable by the external device.

Providing the first version of the digital image and the associated multiple first parameters to the external device can further include providing the first version for display as an icon on a display device operatively coupled to the external device. The first version of the digital image can be presented on the display device responsive to a selection of the icon. More than one first parameter can share one or more first features. A digital image adjustment can be a first parameter, and features pertaining to digital image adjustment can be the first features included in the digital image adjustment parameter. The features can include one or more of a digital image hue, a digital image color, and a digital image saturation.

Combining the first features of the first version and the second features of the second version based on the comparing can further include determining that the changes to the first features are different from the changes to the second features; and in response to the determining, associating the changes to the first features to the digital image. Determining that the change to the first features are different from the changes to the second features can include comparing each first value associated with each first feature with each second value associated with each second feature, and determining that at least one first value equals at least one second value. Combining the first features of the first version and the second features of the second version based on the comparing can further include determining that the changes to the first features conflict with the changes to the second features, and in response to the determining, providing a message indicating the conflict.

Combining the first features of the first version and the second features of the second version based on the comparing can further include determining that the changes some of the first features conflict with the changes to some of the second features, and changes to the remaining first features are different from changes to the remaining second features, and in response to the determining, associating the changes to the remaining first features to the digital image and providing a message indicating the conflict with respect to the some of the first features.

Another innovative aspect of the invention described here can be implemented in a computer-readable medium tangibly encoding software instructions executable by data processing apparatus to perform operations. The operations include providing an item of digital content and associated multiple parameters, each including a plurality of features of the item, a given feature associated with a value by which the given feature is tracked, detecting changes to one or more features associated with a parameter, for each change to a respective feature of the one or more features, associating a corresponding time stamp indicating a time of change, storing each change and the corresponding time stamp to track the changes, and grouping in a single record, values associated with the one or more features to which changes were detected, the values grouped based at least in part on a time span within which the changes were detected.

This, and other aspects, can include one or more of the following features. Changes to the one or more features in a time span less than or equal to ten minutes can be grouped in the single record. The operations can further include creating a new record, and grouping in another record, values associated with new one or more features to which changes were detected, the values grouped in the other record based on conditions causing the new record to be created. The item of digital content can be provided using a software application. Changes to the one or more features can be made through the software application. One of the conditions for causing the new record to be created can include a quitting and a re-launching of the software application. Providing the item of digital content can include splitting the item of digital content from a folder in which the item of digital content was stored. One of the conditions for causing the new record to be created can include detecting the splitting. The item of content can be split from a folder in which the item was stored. One of the conditions for causing the new record to be created can include detecting a merging of the split item of content with the folder. The item of digital content can be a digital image.

Another innovative aspect of the invention described here can be implemented in a system that includes data processing apparatus, and a computer-readable medium tangibly encoding software instructions executable by the data processing apparatus to perform operations. The operations include receiving input to transfer an image to an external device, the image residing at a hierarchical position in a master hierarchy of images. Master information to access each image is distributed across the master hierarchy. The operations include, in response to the receiving, creating a child hierarchy of images including the selected image and child information included in the master information. The child information includes portions of the master information to access the child image. The image is accessible independent of the master information using the child information. The child information is distributed across the child hierarchy. The operations include transmitting the child hierarchy of images to the external device.

This, and other aspects, can include one or more of the following features. The child hierarchy of images can be stored as an independent executable file on the external device. The child information stored in the independent executable file can cause the image to be launched when the independent executable file is selected. The external device can be configured to execute a software application configured to execute the independent executable file. The child information can cause the external device to execute the software application to launch the digital image when the independent executable file is selected using the external device.

Particular implementations of the subject matter described in this specification can be implemented to realize one or more of the following advantages. The ability to split and merge folders containing digital content can enable working on the digital content in more than one computing device. Tracking the changes made to the digital content can enable resolving any conflicts that can be generated by simultaneous changes to features of the same content using different devices.

The details of one or more implementations of the specification are set forth in the accompanying drawings and the description below. Other features, aspects, and advantages of the specification will become apparent from the description, the drawings, and the claims.

BRIEF DESCRIPTION OF THE DRAWINGS

Like reference numbers and designations in the various drawings indicate like elements.

DETAILED DESCRIPTION

Methods, apparatuses, and systems for splitting and combining digital content in hierarchies are described. Digital content, stored in a hierarchy of folders includes digital media items, for example, digital images, that have associated parameters. Each parameter can include a collection of one or more features, each of which can be altered in response to user input. For example, a digital image adjustment is one type of a parameter associated with a digital image. Features pertaining to the digital image adjustment include an image hue, an image color, an image saturation, and the like. Each of these features can be altered by a user who manipulates the digital image using a software application executing on a computing device. Changes to the digital image are tracked using change tracking tables (also referred to as change tables), as described below. In some scenarios, a container housing digital content objects can be "split," (for example, copied, moved or otherwise transferred) from a first computing device that stores the hierarchy that includes the container. Splitting creates a copy of the container including the digital content. The original is retained in the first computing device and the copy is transmitted to a second computing device. The digital content in the container can be edited using the second computing device. The edits can be tracked by the second computing device and associated with the digital content. Subsequently, when the edited digital content is combined, i.e., merged, with the first computing device, changes to the content can be compared using techniques described with reference to the following figures. Further, conflicts that can arise due to change to identical features of the digital content using both computing devices can also be resolved.

Figure 1:
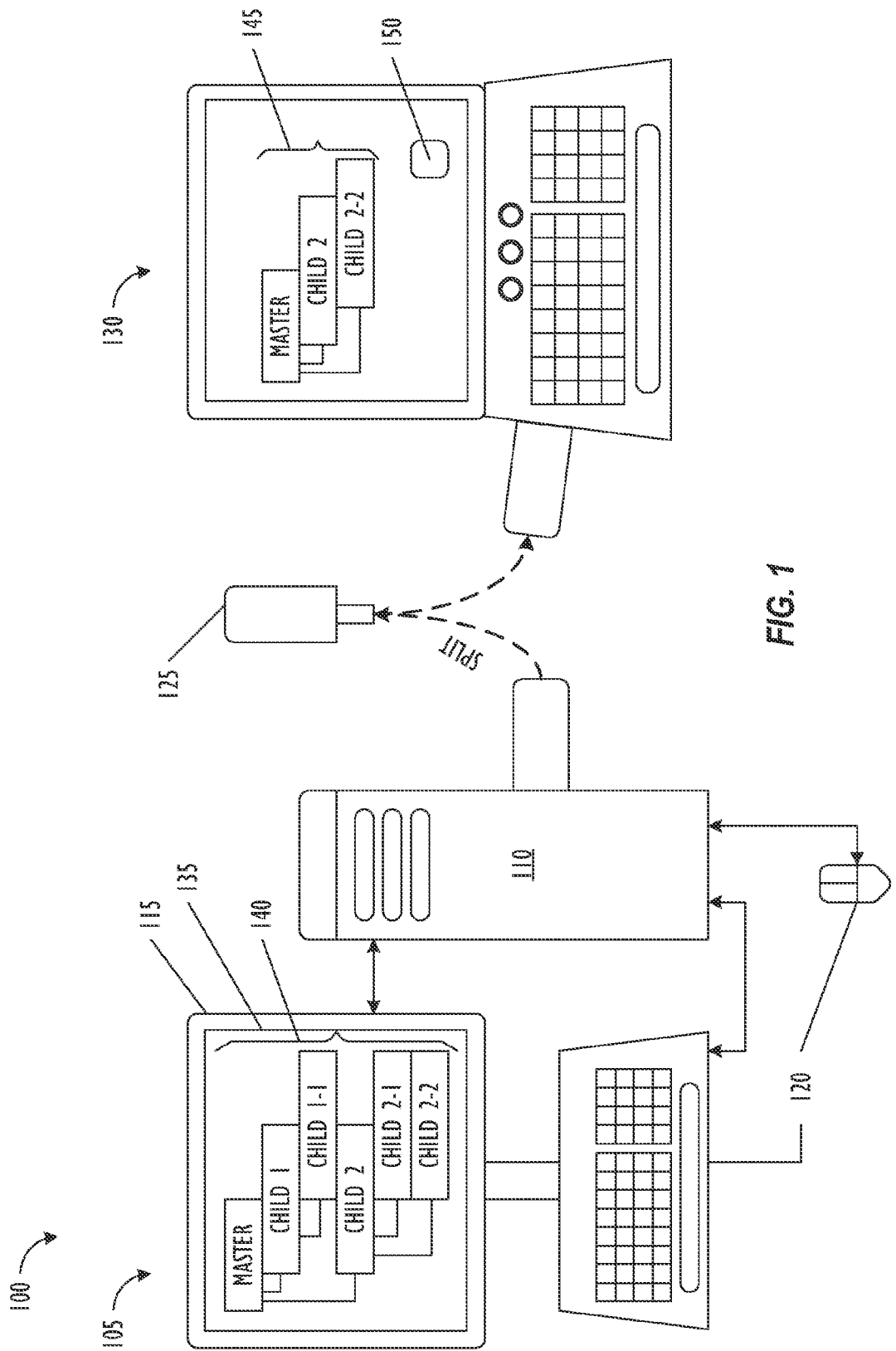
FIG. 1 shows an example system for splitting digital media items from a master hierarchy into a child hierarchy.

FIG. 1 shows an example system 100 for splitting digital content from a master hierarchy into a child hierarchy. The system 100 includes a computing device 105 configured to execute a software application that can provide digital content. The computing device 105 can be a desktop computer, a laptop computer, a personal digital assistant (PDA), and the like. The computing device 105 includes a computer 110, for example, a central processing unit (CPU), that is operatively coupled to a display device 115. Input devices 120, for example, a keyboard, a mouse, a stylus, and the like, are operatively coupled to the computer 110. Using the input devices 120, the user can provide input to execute the software application. In response to the input, the computer 110 can provide the digital content in a user interface 135 displayed in the display device 115.

A storage device, for example, a hard disk, is operatively coupled to the computer 110 to store both the digital content and the software application, i.e., libraries of data and code that need to be executed to operate the software application. The computing device 105 can be operatively coupled to another external device 125 (for example, a memory device, a notebook computer, a desktop computer, a handheld computer or other mobile device), either directly or via a wired or wireless network, to which the digital content, including portions of the libraries of data and code, can be transferred. As described later, in response to an input to transfer the digital content, the first computing device 105 splits the digital content, for example, creates a copy of the digital content. Further, the first computing device 105 retains the original digital content and the portions, and transfers the split content and portions to the external device 125. In some implementations, the external device 125 is a storage device, for example, a portable thumb drive, a portable hard disk, and the like.

The digital content transferred to the external device 125 can further be transferred to and accessed using a second computing device 130 that executes the software application. In some implementations, the first computing device 105 packages the split digital content and the portions in a format that can be displayed as an icon 150 in a display device of the second computing device 130. As described later, when the icon 150 is selected, the software application installed in the second computing device 130 is launched, and the split digital content is presented.

In response to input, the second computing device 130 can change features associated with the split digital content. As described later, the changes are tracked, for example, to determine a feature that was changed and a time that the feature was changed. The tracked changes are associated with the split digital content. Subsequently, the split digital content and the associated tracked changes can be combined, i.e., merged, with the original digital content stored in the first computing device 105. Based on the times associated with the changed features, the first computing device 105 can determine if corresponding features of the digital content were changed using the first computing device 105 subsequent to the splitting. Upon determining that the changes were not made, then the first computing device 105 associates the changes to the original digital content as new features. Upon determining that the original digital content has been changed since splitting, the first computing device 105 provides messages indicating that changes to the digital content by the second computing device 105 conflict with those by the first computing device 105, and seeks user input to resolve the conflicts.

In some implementations, the digital content is stored on the storage device operatively coupled to the computer 110. The computer 110 executes the software application to create a master hierarchy 140 of containers, for example, file folders, in which the digital content is stored. An example master hierarchy 140 is shown in FIG. 1. The master hierarchy 140 includes data and code that the computer 110 executes to launch the software application using which a user can perform operations on the digital content, for example, digital images. In the master hierarchy 140, "Child 2-2" is a child folder of parent folder, "Child 2," which, in turn, is a child folder of the root folder, "Master." In some implementations, the first computing device 105 displays the master hierarchy 140 in the user interface 135. The first computing device 115 allows a user to select an object, for example, an icon, representing the "Child 2-2" child folder and move the selected icon to a folder representing the external device 125. The selecting and moving represents an input to split the contents of "Child 2-2" folder to the external device 125.

In response, the first computing device 105 creates a copy of the entire contents of the "Child 2-2" folder. Software instructions to allow the providing of the contents of the "Child 2-2" folder can be distributed across the master hierarchy 140. For example, some of the instructions can be included in the "Child 1" folder; some instructions can be included in the "Master" folder. The first computing device 105 can copy the entire contents of the "Child 2-2" folder as well as information that is distributed across the hierarchy 140 that are used to provide the contents of the "Child 2-2" folder. In some implementations, the first computing device 105 creates a child hierarchy of digital content that includes only the portions of the master hierarchy used to provide the digital contents in the "Child 2-2" folder. A process by which the child hierarchy is created is described with reference to FIG. 2.

Figure 2:
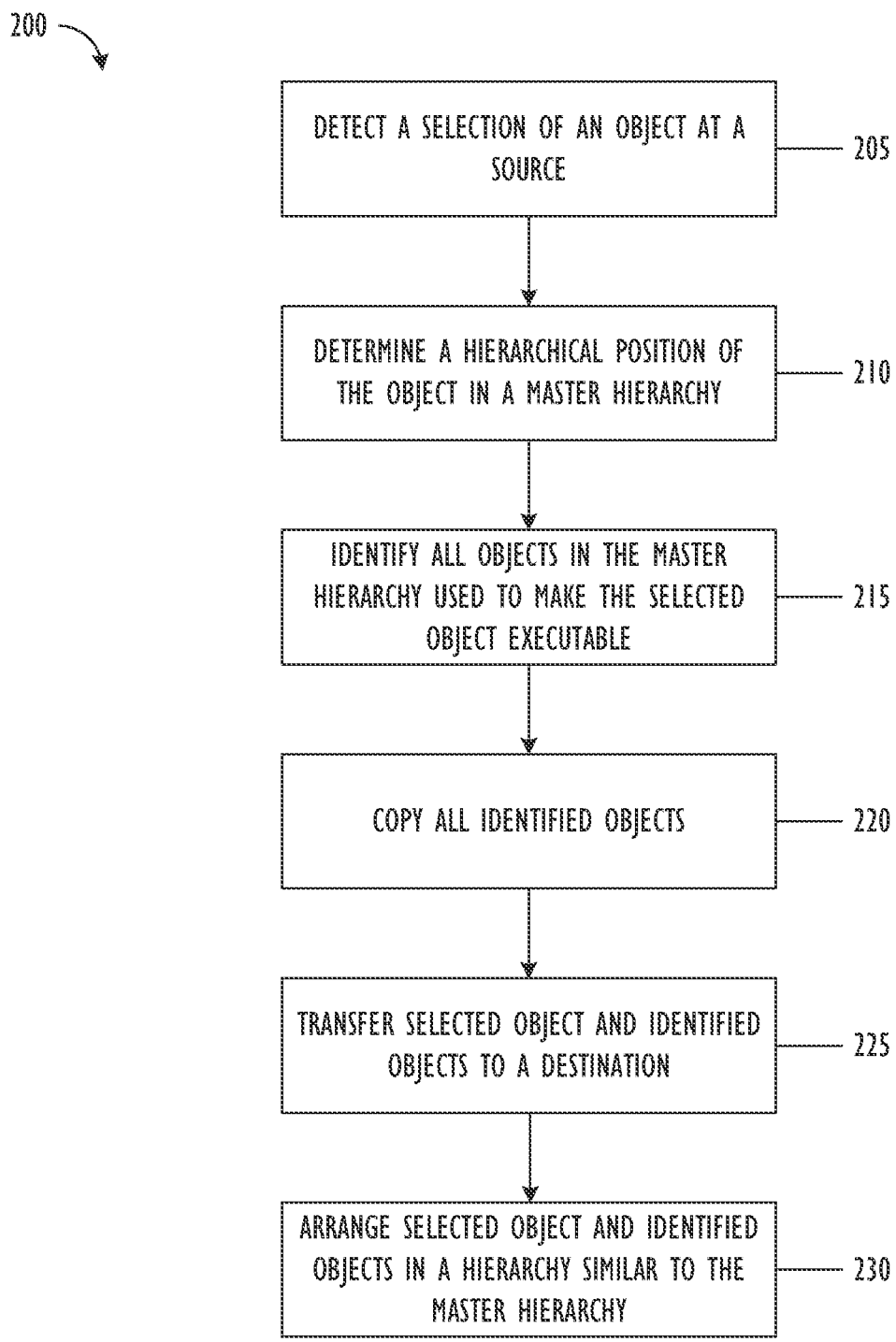
FIG. 2 is a flowchart of an example process for creating a child hierarchy of digital content from a master hierarchy.

FIG. 2 is a flowchart of an example process 200 for creating a child hierarchy of digital content from a master hierarchy. The process 200 detects a selection of an object at a source at 205. For example, the first computing device 105 detects a selection of an object, for example, an icon, representing a folder in a master hierarchy. The process 200 determines a hierarchical position of the object in a master hierarchy at 210. The process 200 identifies all objects in the master hierarchy used to make the selected object executable at 215. For example, the first computing device 105 identifies the contents of the selected folder and all portions of software instructions that are used by the software application to present the contents. The process 200 copies all the identified objects at 220. The process 200 transfers the selected object and identified objects to a destination at 225. For example, the first computing device 105 transfers the folder including digital contents and the portions of software instructions to an external device that further transmits to the second computing device 130. Alternatively, the first computing device 105 transfers directly to the second computing device 130. The process 230 arranges the selected object and the identified objects in a hierarchy similar to the master hierarchy. For example, the first computing device 105 packages the selected folder and the portions of software applications to be provided as an icon on the second computing device 130.

When the icon is selected, the child hierarchy is established in the second computing device 130. In this manner, the first computing device 105 packages the split content such that the split content is stored as an independent executable file on the second computing device 130. The split content includes child hierarchy information stored in the independent executable file. The icon presented by the second computing device 130 represents the independent executable file that causes the software application to be launched in the second computing device 130, when the independent executable file is selected. The split digital content can be edited using the second computing device 130.

In another example, a child folder in a hierarchy can include a collage created by a collection of digital images. The digital images in the collage can be distributed across the master hierarchy, for example, stored as data files in the same child folder, in a parent folder, in the master folder, and the like. The child container in which the collage is stored is the object stored in the first computing device 105 that is selected for splitting and transmitting to the second computing device 130. In response to the selecting, the first computing device 105 copies all the objects necessary to render the collage, including all the digital images that form the collage and are distributed across the master hierarchy. The first computing device 105 packages and transfers the objects as a child hierarchy to the second computing device 130, which presents the object as a selectable icon. In this manner, the second computing device 130 can present the collage and can enable editing the digital content in the collage. Subsequently, the edited content, along with changes made by editing, can be merged with the digital content in the master hierarchy from which the child hierarchy was split, as described with reference to FIG. 3.

Figure 3:
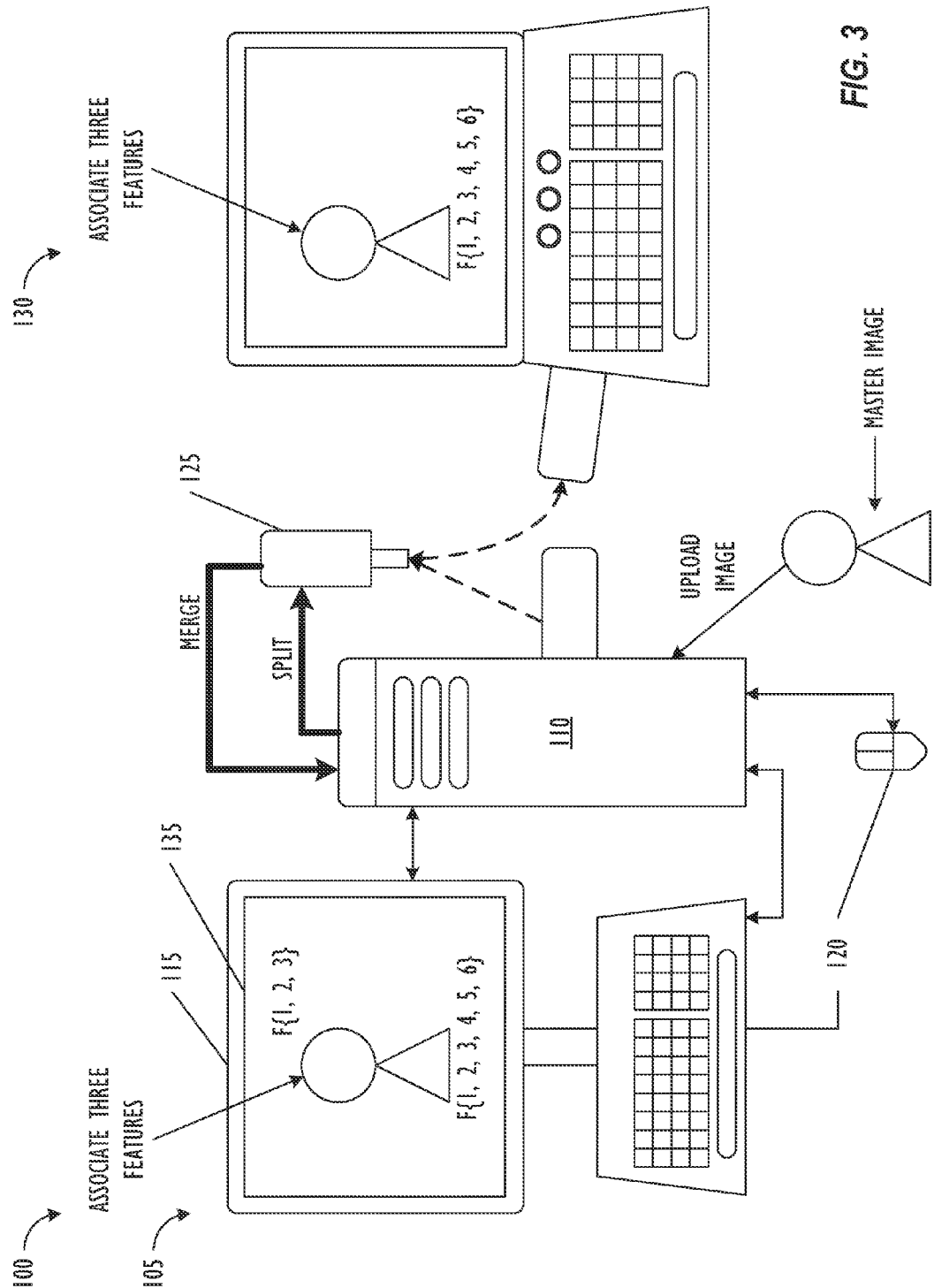
FIG. 3 shows an example system for splitting and merging digital content between computing devices.

FIG. 3 shows an example system 100 for splitting and merging digital content between computing devices. In some scenarios, digital content, for example, a digital image, is uploaded to the first computing device 105. For example, the digital image is captured and stored using a digital camera. When the digital camera is operatively coupled to the computer 110, the digital image is transferred to the first computing device 105. The computer 110 executes the software application that causes the digital image to be displayed in the user interface 135 displayed in the display device 115. In response to receiving inputs from the input devices 120, the first computing device 105 can associate features to the uploaded digital image using the software application. For example, a user uses tools provided by the software application to change three features of the digital image, for example, an image color, an image hue, and an image saturation. The first computing device 105 associates the three features to the digital image, and tracks changes to the features, as described later.

Subsequently, in response to input, the first computing device 105 can export the digital image with the three associated features to the second computing device 130. To do so, in some implementations, the first computing device 105 can split the digital content including the digital image, the associated three features, and portions of the software instructions used to create an independent executable file using which the digital image can be accessed. The system 105 can transmit a copy of the digital content to an external device 125, which is received by the second computing device 130. Using the software application installed in the second computing device 130, three additional features can be added to the digital image. Thus, the digital image with three features that was split from the first computing device 105 has six features subsequent to editing in the second computing device 130. Subsequently, the digital image and the associated features in the second computing device 130 can be merged into the first computing device 105.

In some scenarios, the digital image in the first computing device 105 to which three features were associated may not have been edited since the digital image was split and transmitted to the external device 125. Alternatively, or in addition, features other than those associated with the digital image by the second computing device 130 may have been edited using the first computing device 105. In either of such scenarios, when the digital image in the second computing device 130 to which six features are associated is merged with the first computing device 105, the three additional features associated using the second computing device 130 are associated with the digital image. Subsequent to the associating, the digital image in the first computing device 105 is associated with six features.

Each feature can be represented as metadata that is associated with a copy of the digital image. For example, when a master digital image that is in color, is rendered in black-and-white, then the black-and-white feature is associated with a copy of the master digital image. The master digital image remains in color. The black-and-white feature is metadata associated with the copy. The black-and-white feature is one of several features included in the adjustment parameters, changes to which are tracked in change tracking tables, which are described later.

Another adjustment that the user can make is to render the digital image in Sepia. In response, in some scenarios, a copy of the color master digital image is created, the Sepia feature is applied to the copy, and the Sepia feature is represented as metadata associated with the copy. In such scenarios, two copies of the same master digital image have been created, and a corresponding feature has been adjusted for each copy. In some scenarios, the Sepia feature can be applied to the black-and-white copy. In such scenarios, both the black-and-white and the Sepia features are applied to the same copy, and thereby combined. Both, the black-and-white feature and the Sepia features, are represented as metadata associated with the same copy. The application of both features is tracked in change tracking tables.

In another example, in response to input to render a color image in black-and-white, a copy of the master digital image can be created and the black-and-white feature can be applied to this copy, as described above. Subsequently, in response to input to crop the black-and-white image, a portion of the black-and-white copy can be cropped. Both, the application of black-and-white and the cropping are features applied to the same copy that are tracked. In such scenarios, if the application of black-and-white is performed using the first computing device 105 and the cropping is performed using the second computing device 130, when the digital images are merged, then the cropping feature and the black-and-white feature are associated with the same copy of the master digital image.

In some scenarios, the same three features that were associated with the digital image using the first computing device 105 may have been edited using the second computing device 130. Alternatively, or in addition, the three features that were associated with the digital image using the second computing device 130 may have also been associated with the digital image using the first computing device 105. In either of such scenarios, when the digital image in the second computing device 130 is merged with the first computing device 105, then the first computing device 105 raises a conflict as described with reference to FIG. 4.

Figure 4:
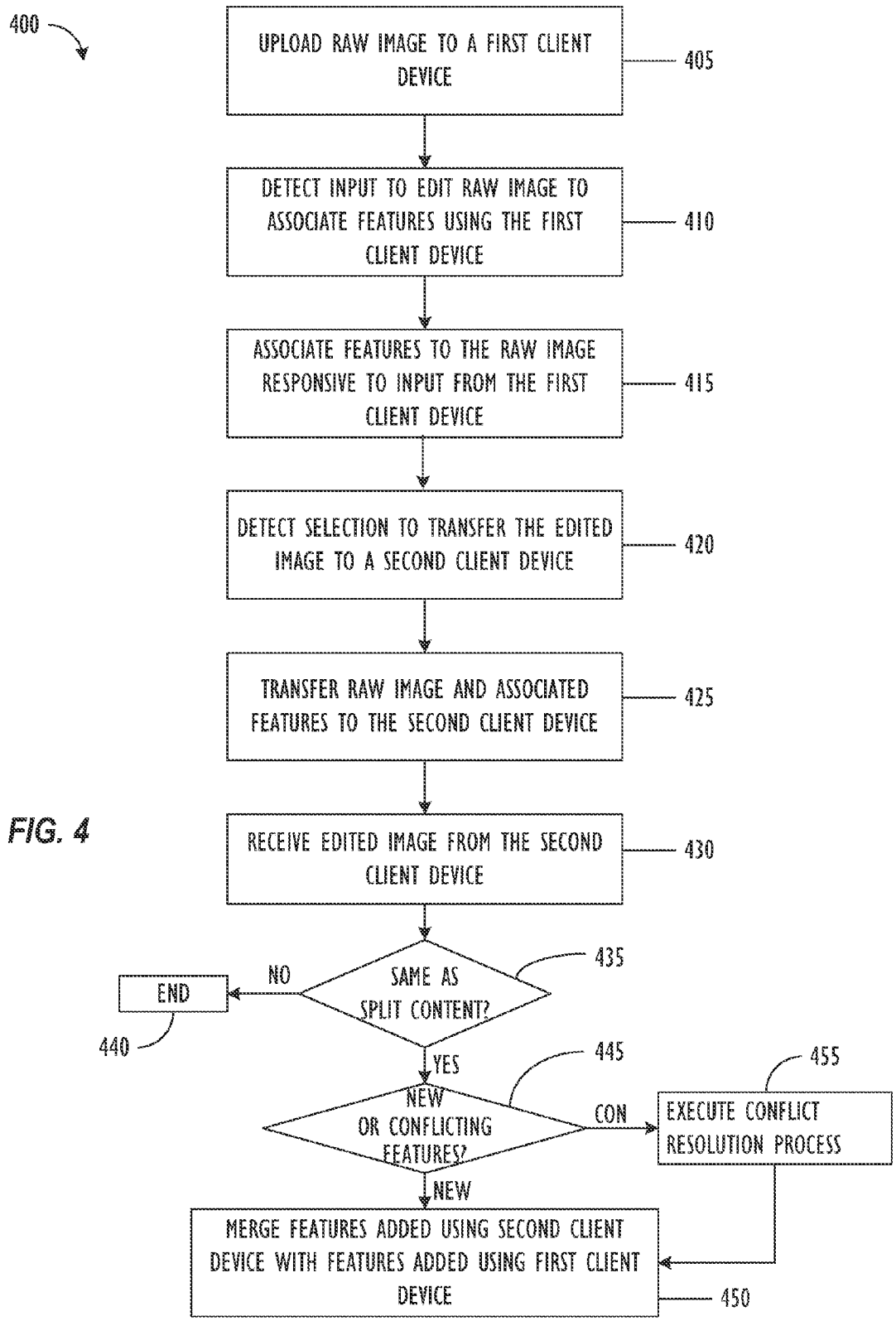
FIG. 4 is a flowchart of an example process for managing digital content that was previously transmitted in response to input to split.

FIG. 4 is a flowchart of an example process 400 for managing digital content that was previously transmitted in response to input to split. The process 400 uploads raw image to a first computing device at 405. For example, the first computing device 105 receives a raw digital image. The process 400 detects input to edit the raw image to associate features using the first computing device at 410. For example, using input devices 120, a user of the software application executing on the first computing device 105 provides input to associate features to the raw digital image. The process 400 associates features to the raw image responsive to input from the first computing device at 415. The process 400 detects selection to transfer the edited image to a second computing device at 420. For example, the first computing device 105 detects input to split the raw image and the associated features and to transmit the split image to the second computing device 130. The process 400 transfers the raw image and the associated features to the second computing device 130 at 425.

The process 400 receives the edited image from the second computing device at 430. For example, the first computing device 105 detects an input to merge the raw image and the associated features that were split and transmitted to the second computing device 130. In some scenarios, the digital content to be merged can be transferred from the second computing device 130 to the external device 125, which can be operatively coupled to the first computing device 105. Alternatively, the digital content to be merged can be stored on the second computing device 105 coupled directly to the first computing device 105. The process 400 checks if the received digital content is the same as the split content at 435.

For example, the first computing device 105 checks if the digital image that was merged includes either new features that were associated after the digital image was split from the first computing device 105 or changes to features that were associated before the split. If the process 400 determines that the digital content received for merging is identical to the split content, then the process 400 ends at 440. For example, if the first computing device 105 determines that the raw image and the associated features received are identical to the raw image and the associated features already stored in the storage device operatively coupled to the first computing device 105, then there is no need to merge and the first computing device 105 does not perform a merging operation. In some implementations, merging is attempted upon determining that changes to features have been made. Because features are associated with the digital images as metadata, if, when attempting to merge, it is determined that the metadata of two digital images are identical, then it is determined that there is no need to perform the merging operation.

In some situations, although the process 400 determines that the digital content received for merging is identical to the split content, the process 400 can add the received digital content such that the received content is separate and distinct from the split content. In such situations, the first computing device 105 can tag the received digital content to indicate that the content was received from the second computing device 130. To do so, for example, the first computing device 105 can associate an identifier of the second computing device 130 with the metadata of the received digital content.

The process 400 then determines if the digital content received for merging includes new or conflicting features at 445. For example, the first computing device 105 checks if new features, that were not associated with the digital image before or after the split from the first computing device 105, have been associated with the digital image, for example, by the second computing device, received for merging. If the process 400 determines that such new features have been associated, then the process 400 merges features added using the second computing device with the features added using the first computing device at 450.

Alternatively, the process 400 determines a presence of conflicting features in the digital content received for merging. Conflicting features can occur when a feature associated with the digital image that is retained by the first computing device 105 has been changed by both the first and second computing devices after splitting. For example, the first computing device 105 can associate a feature to the digital image in response to input. Subsequently, the digital image and the associated feature can be split and transmitted for editing using the second computing device 130. After splitting, a first user can change the feature using the first computing device 105 and a second user can change the same feature using the second computing device 130. When the first computing device 105 receives an instruction to merge the digital image, then the first computing device 105 can identify a conflict because the same feature has been changed by two different computing devices post splitting. In some scenarios, after splitting, a new feature can be associated with the digital image using the first computing device 105. The same new feature can also be associated with the split digital image using the second computing device 130. In such scenarios also, the first computing device 105 can detect a conflict upon receiving merging instructions.

If the process 400 determines that the digital content received for merging includes new features only, i.e., features that were not associated with the digital content by the first computing device 105 after splitting, then the process 400 merges the features by associating the new features with the digital image at 450. If the process 400 determines conflicting features, then the process executes a conflict resolution process 455 described later. In some implementations, the first computing device 105 can identify new features and conflicting features. In such implementations, the first computing device 105 merges the new features upon identifying and merges the conflicting features after resolving the conflict by executing the conflict resolution process.

Figure 5:
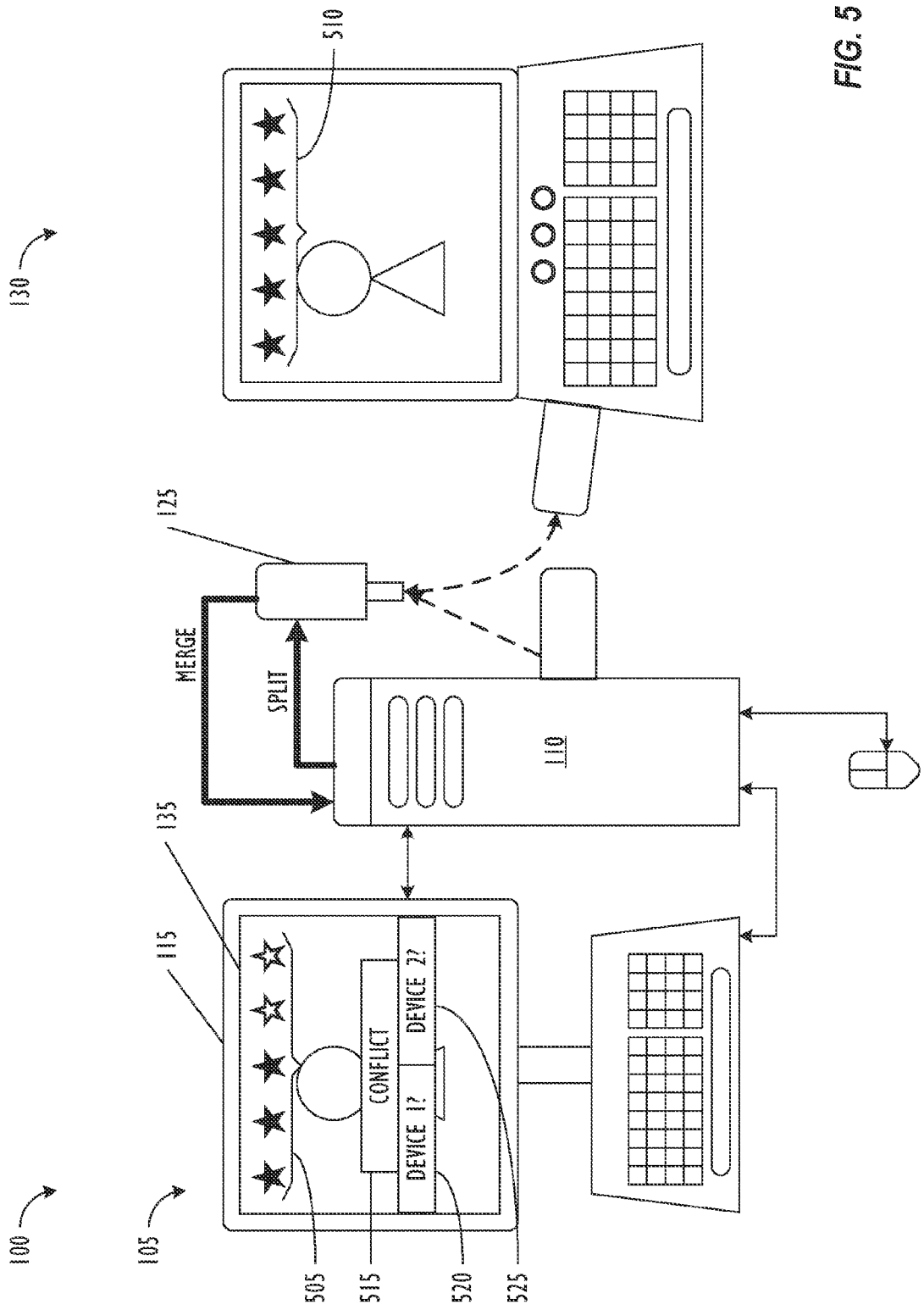
FIG. 5 shows an example system for presenting a message indicating a conflict during merging.

FIG. 5 shows an example system 100 for presenting a message indicating a conflict during merging. In some scenarios, identical features are associated with a digital image using the first computing device 105 and with the copy of the digital image that has been split and transmitted to the second computing device 130. For example, a user uploads the digital image to the first computing device 105 and subsequently splits and transmits the digital image to the second computing device 130. As described previously, splitting creates an independently executable file that the code and data that the second computing device 130 will use to execute the file to present the digital image. In some scenarios, after splitting, the first computing device 105 can be used to associate a feature with the digital image. For example, using the first computing device 105, a 3-star rating 505 can be associated with the digital image. Independently, using the second computing device 105, a 5-star rating 510 can be associated with the digital image. Thus, the same feature associated with the digital image, i.e., a rating, has been changed using the first computing device 105 and the second computing device 130, after splitting.

Subsequently, an input to merge the digital image with the 5-star rating 510 with the library of digital images stored in the first computing device 110 can be detected. The first computing device 110 determines the presence of a conflict due to an identical feature having been associated with the same digital image by two different computing devices. Specifically, the first computing device 105 determines that, post splitting, changes have been made to the rating feature using both the first and second computing devices. As described later, the first computing device 105 makes this determination based on time stamps indicating times when features associated with digital images are changed. In response to the determining, the first computing device 105 presents a conflict message 515, for example, a dialog box displaying "CONFLICT," in the user interface 135. Adjacent to the conflict message 515, the first computing device 105 presents two controls 520 and 525 corresponding to the first computing device 105 and the second computing device 130, respectively. In this manner, the first computing device 105 prompts the user to select the features associated by either the first computing device 105 or the second computing device 130. Further, based on the response, the first computing device 105 retains the selected feature and disregards the other feature. In this manner, conflicts between identical features associated with the same digital content by different computing devices are resolved. An example process for doing so is described with reference to FIG. 6.

Figure 6:
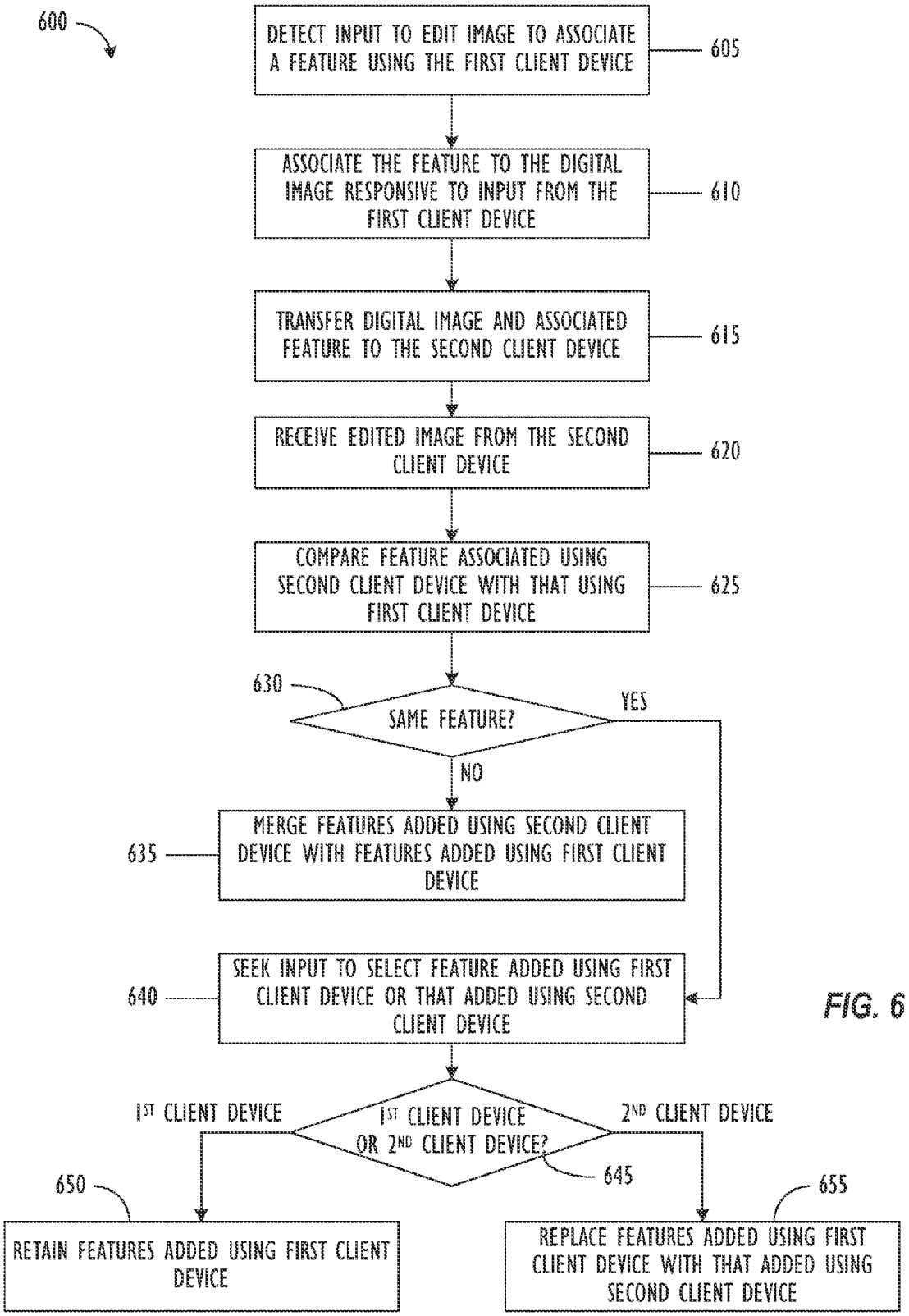
FIG. 6 is a flowchart of an example process for resolving conflicts between merged digital images.

FIG. 6 is a flowchart of an example process 600 for resolving conflicts between merged digital images. The process 600 detects input to edit an image to associate a feature using the first computing device at 605. The process 600 associates the feature to the digital image responsive to input from the first computing device 610. The process 600 transfers the digital image and associated feature to the second computing device at 615. For example, the first computing device 105 splits and transfers the digital image to the second computing device 130, either directly or through the external device 125. The process receives the edited image from the second computing device at 620. For example, the second computing device 130 alters features associated with the digital image responsive to input, and subsequently transmits the digital image and the associated features for merging with the library of images in the first computing device 105.

The process 600 compares the features associated using the second computing device with those associated using the first computing device at 625. The process 600 checks for the presence of same features at 630. If the process 600 determines that, post splitting, none of the features associated using the first computing device are the same as those associated using the second computing device, then the process 600 merges the features at 635.

If the process 600 determines that, post splitting, one or more identical features have been associated with the digital image using both computing devices, then the process 600 seeks input to select features added using either the first computing device or the second computing device at 640. For example, the first computing device 105 presents a conflict message as described previously. If the process 600 determines a selection of the $1^{st}$ computing device at 645, then the process 600 retains features added using the first computing device at 650. If the process 600 determines a selection of the $2^{nd}$ computing device at 645, then the process 600 replaces the features added using the first computing device with that added using the second computing device.

In some scenarios, the features associated by two different computing devices that cause a conflict need not be the same. For example, after splitting, the first computing device 105 can be used to assign a black-and-white feature to a digital image. The second computing device 130 can be used to assign a sepia feature to the same digital image. Subsequently, when the first computing device 105 detects a request to merge the digital image, then the first computing device 105 can detect a conflict. Although the same digital image can have both black-and-white and sepia features concurrently, this may or may not be what a user of the two computing devices intended. By presenting the conflict message, the process 600 seeks input regarding the feature that the user intends retain. In some situations, the process 600 provides the conflict message and seeks user input as it may not be possible to apply both features to the same image.

In another example, a conflict may not arise if the features associated with the digital image by the two different computing devices after splitting are different. For example, after splitting, the first computing device 105 is used to associate a keyword to a digital image, and the second computing device 130 is used to associate a color to the split digital image. Merging the digital image from the second computing device 130 with the first computing device 105 will not cause a conflict because a concurrent presence of a color feature and a keyword feature does not affect the digital image.

In another example, after splitting, a digital image in a master hierarchy, for example, stored in the first computing device 105, can be deleted. The same digital image in the child hierarchy, i.e., in the second computing device 130, may not be deleted, but rather may be edited to associate additional features. In such scenarios, a conflict is raised when the digital image from the second computing device 130 is merged with the master hierarchy in the first computing device 105. If input is received to select the digital image that was edited using the second computing device 130, then the image deleted using the first computing device 105 remains deleted. If instead the deleted image is selected, then the deleted image is restored. In general, a deleted image is not deleted permanently from data storage; rather, the deleted is retrievable.

As described previously, features are associated with the digital content in response to inputs received, for example, from users of the computing devices. The software applications executed by the computing devices include software instructions that cause the computing devices to track the association of features to the digital content and changes to the features responsive to input. In some implementations, the first computing device 105 is configured to associate a time stamp with each operation performed on the digital content. As described below, the first computing device 105 detects conflicts based on a comparison of time stamps associated with different operations. To associate a time stamp, the first computing device 105 detects an input to perform an operation on the digital content, for example, associating a feature to a digital image, determines a time of the input, for example, from a clock in the first computing device 105, and associates the time as the time stamp for the operation.

In some implementations, when the first computing device 105 splits and transmits a master folder including digital content in a master hierarchy, to a child folder included in a child hierarchy in the second computing device 130, the first computing device stores a time stamp indicating the time of splitting, for example, in a change tracking table, described below. For example, the splitting operation is associated with a unique identifier, such as, a hexadecimal value, that is stored in a row of the change tracking table. In the same row, the time stamp is also stored. Subsequently, when changes are made to a digital image in the master folder, for example, to associate features to the digital image, corresponding time stamps are added to the change tracking table. For example, the change tracking table includes an entry for each unique identifier representing an operation and a time stamp indicating a time of executing the operation. In this manner, the first computing device 105 tracks all operations performed on the digital image in the master folder. Similarly, the second computing device 130 tracks all operations performed on the digital image in the child folder, for example, in a similar change tracking table. In some implementations, the change tracking table tracks only the features that have been changed and a time of the change. The nature of the change can be stored in a separate table. For example, if a rating feature of an image is changed at time, $t_1$, then the change tracking table stores the unique identifier corresponding to the rating feature and $t_1$. The actual rating that has been changed can be stored separately.

When the first computing device 105 detects an input to merge the child folder from the second computing device 130 with the master folder, the first computing device 105 receives the change tracking table from the second computing device 130. In some scenarios, no changes have been made to the digital content in the master folder after splitting and until the request to merge is received. In such scenarios, the first computing device 105 does not track any information and the change tracking table is empty. Further, in such scenarios, from the change tracking table of the second computing device 130, the first computing device 105 identifies all features that were changed after the splitting. To do so, for example, the first computing device 105 determines a time of splitting of the master folder to create the child folder, and identifies all features in the change tracking table of the second computing device 130 that have a time stamp occurring after the time of splitting. Based on the determining, the first computing device 105 merges the child folder with the master folder and associates the features associated using the second computing device 130 with the digital content in the master folder.

In some scenarios, changes are made to the digital content in the master folder after splitting and before the request to merge is received. In such scenarios, the change tracking table in the first computing device 105 includes entries indicating the features that were changed and time stamps corresponding to each changed feature. Upon receiving the change tracking table from the second computing device 130, the first computing device 105 compares the time of splitting with the time stamps of features in the change tracking table of the second computing device 130 to determine features that were changed by the device 130 after splitting. Further, the first computing device 105 searches for common unique identifiers in the change tracking tables of devices 105 and 130. The presence of common unique identifiers indicates that, after splitting, a same feature has been changed using both the first computing device 105 and the second computing device 130. In response to this determination, the first computing device 105 present a conflict message and resolves the conflict as described previously.

In some implementations, the first computing device 105 tracks a time of presenting a conflict message and also tracks a time at which the conflict was resolved. In some scenarios, after the conflict has been resolved, the first computing device 105 can receive another request to merge the child folder from the second computing device 130. If no changes have been made to the digital content in the child folder after merging, then the change tracking table in the second content device 130 does not include any entries that occur after the time at which the conflict was resolved. Because the first computing device 105 has already merged the child folder received from the second computing device 130, the first computing device 105 does not repeat the merging despite the other request.

In some scenarios, after the child folder is split from the master hierarchy and transmitted to the second computing device 130, new digital content, for example, digital images can be added to the child folder. Subsequently, during merging, the first computing device 105 can receive and store the new images in the master hierarchy. In some implementations, during merging, the first computing device 105 can create a new folder in the master hierarchy and store the merged digital content in the new folder. In addition, the first computing device 105 can merge the digital content in the child folder with the master folder from which the child folder was split. Subsequently, in response to input, the first computing device 105 can compare the contents in the new folder with the merged contents in the master folder to identify specific changes that were made to the digital content using the second computing device 130 after splitting.

The scenarios described above are applicable to all features that can be associated with the digital image using the software application executed by computing devices. For example, instead of a rating feature, the associated feature can be a color saturation feature. In some scenarios, more than one feature can be associated with the digital image using different computing devices. For example, after splitting, a rating and a color saturation associated with the digital image can be changed using the first computing device 105, and separately using the second computing device 130. In such scenarios, upon merging, a single conflict message can be provided to indicate changes to multiple features using separate computing devices after splitting. Some implementations of the processes by which the change tracking tables are generated is described with reference to the example tables shown in FIG. 7.

Figure 7:
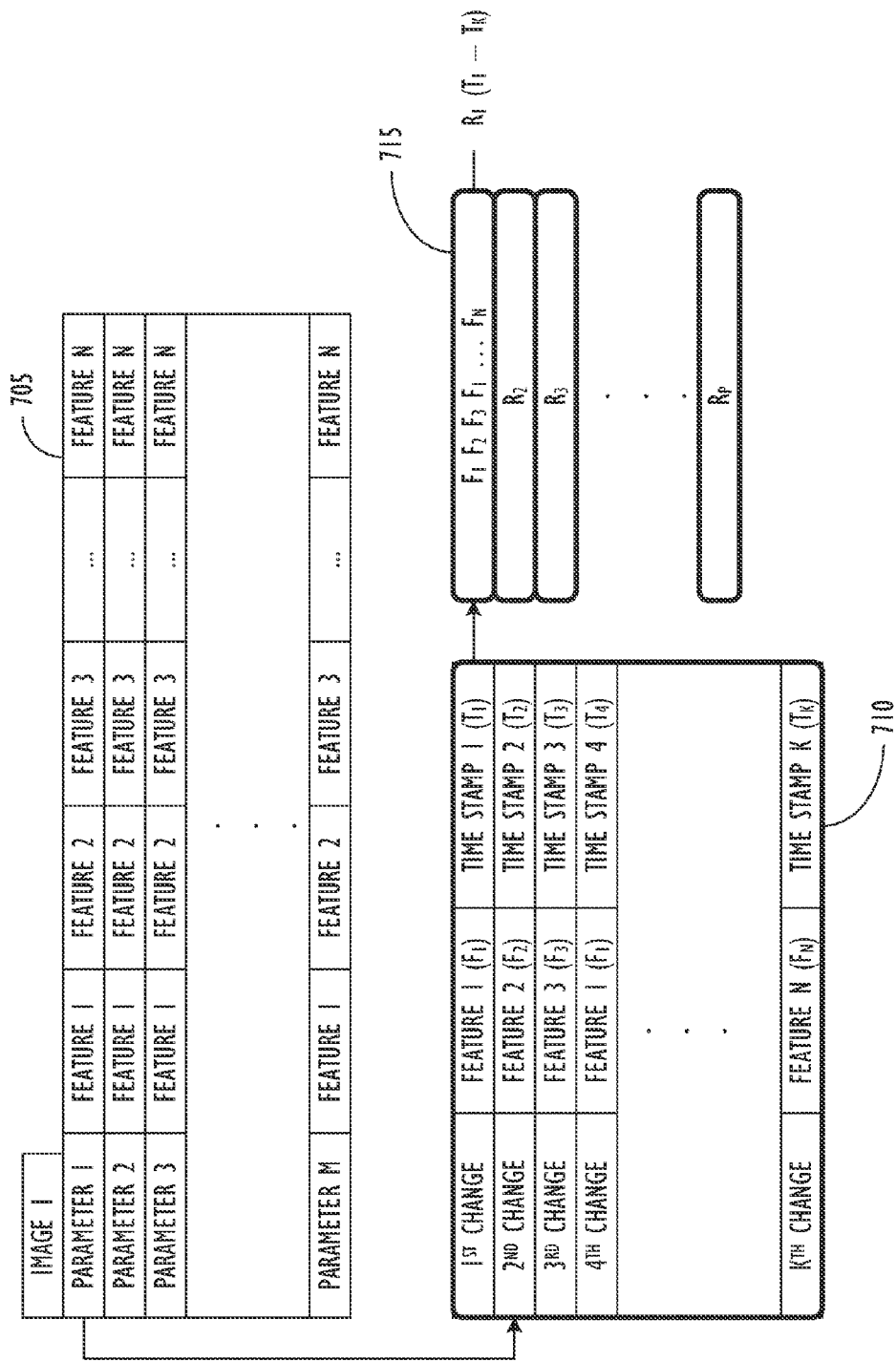
FIG. 7 shows examples of tables to track changes to features associated with digital images.

FIG. 7 shows examples of tables to track changes to features associated with digital images. Each digital image in a master folder is associated with multiple parameters, each of which represent a classification of operations that can be performed on the digital image. For example, adjustments parameter is a classification of operations that can be performed to change an appearance of the digital image. Metadata parameter is another classification of operations that can be performed to change the metadata associated with the digital image. Other examples of parameters include folder parameter (change in the hierarchical position of the digital image), master parameter (change to the raw digital image), version change (changes to versions of the digital image), and the like. Other features that cannot be grouped under a particular classification can be included in the metadata parameter. Each parameter includes a collection of features representing individual operations that can be performed on the digital image. For example, the adjustments parameter can include black-and-white application, color saturation change, color temperature change, and the like, as exemplary features. Similarly, features included in the folder parameter can include re-parenting the digital image, i.e., changing the parent of the digital image in the master hierarchy, re-parenting the folder including the digital image, and the like.

As shown in FIG. 7, the first computing device can create a table 705 for each image, for example, "Image 1," that lists all the parameters associated with the image, for example, parameters 1-m, each parameter including multiple features, for example, features 1-n. For each parameter, the first computing device 105 can create a change tracking table 710. For example, if k changes are made to features associated with Parameter 1, then the change tracking table 710 can store, for each change, the feature that was changed, which can be any of feature 1 ($F_1$) to feature n ($F_n$), and a corresponding time stamp 1 ($t_1$) to time stamp k ($t_k$) indicating a time when the feature was changed.

In addition to tracking features, operations performed on the image can be tracked using the change tracking table 710. For example, the change tracking table 710 can include an entry to indicate that the image is in a child folder that has been split from a master folder and transmitted to an external device. The table 710 can include an entry to indicate that the image has been merged from a child folder to the master folder. Because a feature can be changed more than once, the change tracking table 710 can include multiple entries corresponding to the same feature, each being associated with a unique time stamp.

Thus, the first computing device 105 can create a change tracking table for each of parameters 1-m. The features can be shared across the multiple parameters such that a change to a feature can generate an entry in more than one change tracking table 710. For example, an image rating feature can be a metadata associated with the image. Consequently, a change in the image rating feature can generate an entry in the change tracking table associated with the metadata parameter. In another example, an image adjustment, such as applying Sepia to the image, can generate an entry in the change tracking table associated with the metadata parameter. In addition, applying the Sepia feature can generate a new version of the image, thereby generating an entry in the change tracking table associated with the version parameter.

In some implementations, the first computing device 105 can store changes to the features in a bit mask, as described below, to save data space. In such implementations, each entry that was created to indicate a change to the master image can be mashed into a single row 715 in which each change can be represented by a bit and the row 715 forms the bit mask. In some implementations, after a certain number of changes are stored in a single row, then a new row can be formed to track further changes. For example, all changes that occur sufficiently proximate to one another in time, i.e., within $t_1$ and $t_k$ can be grouped in row $R_1$. Subsequent changes can be grouped in row $R_2$ and so on.

In some implementations, the first computing device 105 creates a new row when a digital image being changed is split from a master folder into a child folder and exported. Similarly, the device 105 creates a new row if the digital image is received for merging. If the software application that is executed by the computing device 105 is quit and re-launched, then the computing device 105 creates a new row. For example, if three changes were made to the same master image within a ten minute time span, then there is one record that indicates all three changes.

In some implementations, the first computing device 105 generates the bit mask in hexadecimal format. Based on the entry in the row 715, the feature that was changed and the time of changing the feature can be determined. Further, the change tracking table 710 is related to the table 705 such that the nature of the change to the feature can be determined.

Figure 8:
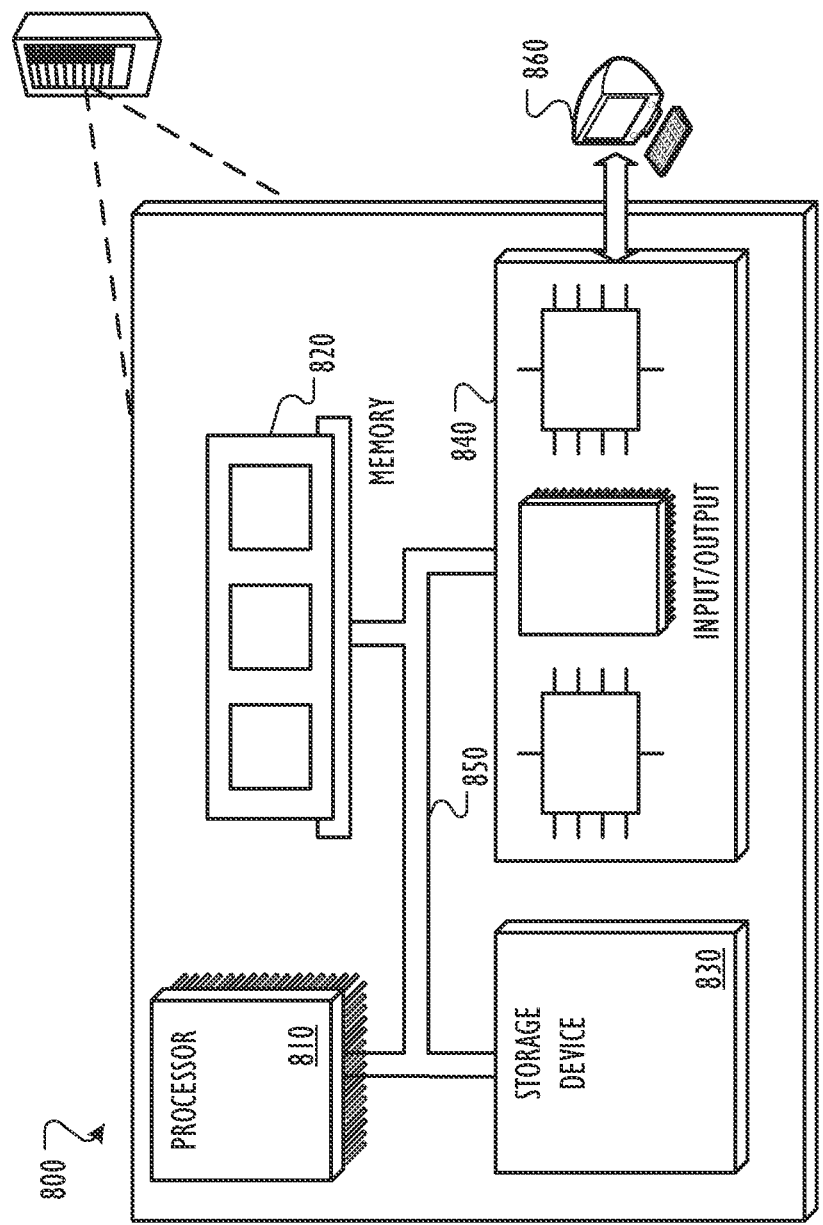
FIG. 8 is an example of a computing device.

An example of a computer in which the above-described techniques can be implemented is shown in FIG. 8, which shows a block diagram of a programmable processing system (system). The system 800 can be utilized to implement the systems and methods described herein. The architecture of the system 800 can, for example, be used to implement a computer client, a computer server, or some other computer device.

The system 800 includes a processor 810, a memory 820, a storage device 830, and an input/output device 840. Each of the components 810, 820, 830, and 840 can, for example, be interconnected using a system bus 850. The processor 810 is capable of processing instructions for execution within the system 800. In one implementation, the processor 810 is a single-threaded processor. In another implementation, the processor 810 is a multi-threaded processor. The processor 810 is capable of processing instructions stored in the memory 820 or on the storage device 830.

The memory 820 stores information within the system 800. In one implementation, the memory 820 is a computer-readable medium. In one implementation, the memory 820 is a volatile memory unit. In another implementation, the memory 820 is a non-volatile memory unit.

The storage device 830 is capable of providing mass storage for the system 800. In one implementation, the storage device 830 is a computer-readable medium. In various different implementations, the storage device 830 can, for example, include a hard disk device, an optical disk device, or some other large capacity storage device.

The input/output device 840 provides input/output operations for the system 800. In one implementation, the input/output device 840 can include one or more of a network interface device, for example, an Ethernet card, a serial communication device, for example, and RS-232 port, and/or a wireless interface device, for example, an 802.11 card. In another implementation, the input/output device can include driver devices configured to receive input data and send output data to other input/output devices, for example, keyboard, printer and display devices 860.

Figure 9:
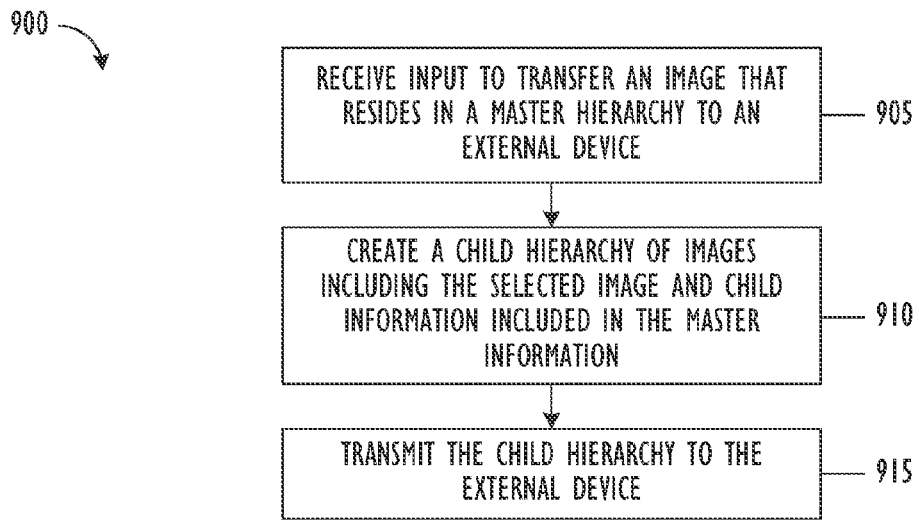
FIG. 9 is a flowchart of an example process for creating a child hierarchy from a master hierarchy.
Figure 10:
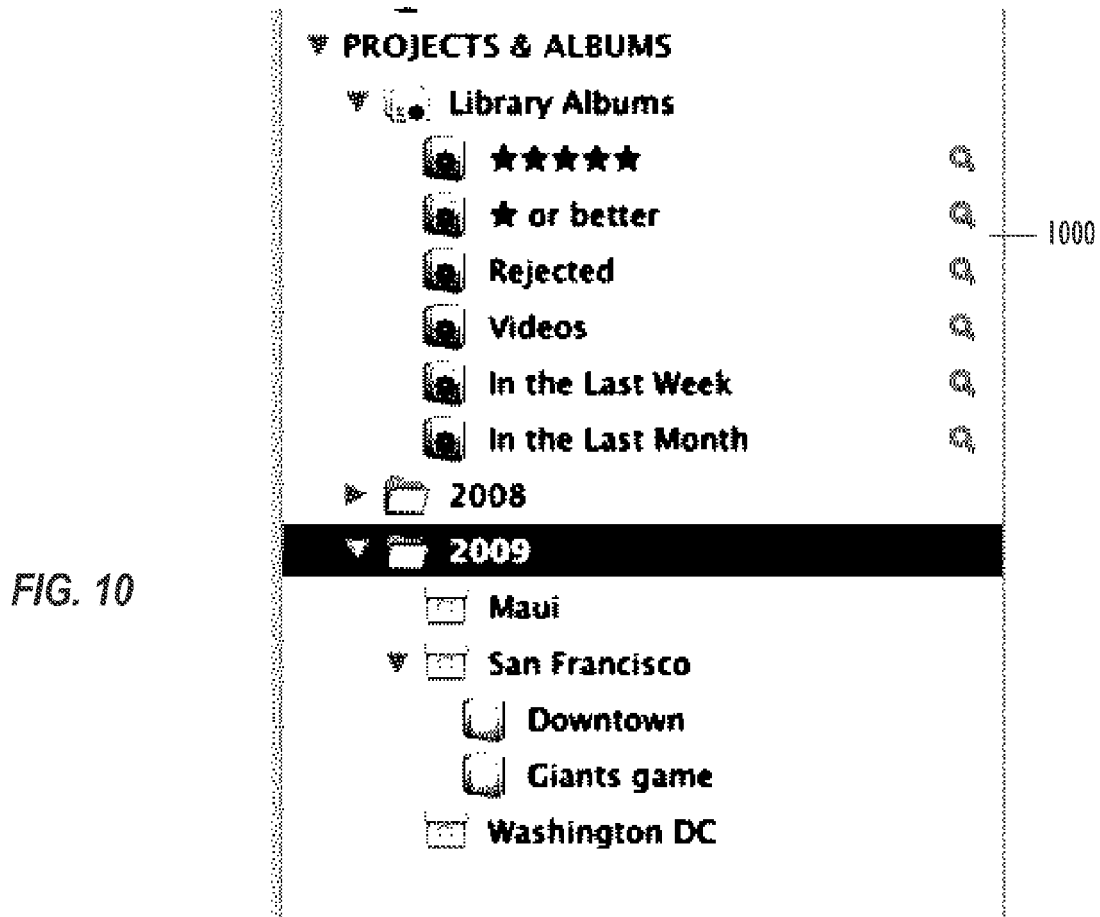
FIG. 10 is an example hierarchy.

FIG. 9 is a flowchart of an example process 900 for creating a child hierarchy from a master hierarchy. FIG. 10 is an example hierarchy. The process 900 is described below with reference to the hierarchy 1000 of FIG. 10. The process 900 receives input to transfer an image that resides in a master hierarchy to an external device at 905. The image resides at a hierarchical position in a master hierarchy of images. Master information to access each image in the hierarchy is distributed across the master hierarchy. For example, the root folder in the master hierarchy is titled "PROJECTS & ALBUMS." Folders titled "Library Albums," "2008," and "2009" are child folders of the root folder. The master hierarchy represents a library that can be split out at any level in the hierarchy, for example, at the "2009" folder level. The process 900 receives input to split out the library at the "2009" folder level. The "2009" folder includes below the folder in the hierarchy, for example, folders "Maui," "San Francisco" and its albums, and "Washington D.C."

The process 900 creates a child hierarchy of images including the selected image and child information to access the image at 910. The child hierarchy is created in response to receiving the input at 905. The child information includes portions of the master information to access the child image. The image is accessible independent of the master information using the child information. For example, splitting out the library at the "San Francisco" project will create a child library that contains the "2009" folder, the "San Francisco" project, and all of the albums inside the "San Francisco" project ("Downtown" and "Giants Game"). Similarly, splitting out the library at the "Giants Game" album level will create a library that has the "Giants Game" album and its parent containers (the "San Francisco" project and the "2009" folder). Although it will include the "2009" folder and the "San Francisco" project, it will not contain the "Maui" project, the "Washington D.C." project, or the "Downtown" album. Also, the "San Francisco" project will only include the images that are in the "Giants Game" album because these are the only parts necessary for the "Giants Game" album to be recreated in the child library.

The process 900 transmits the child hierarchy of images to the external device at 915. The child hierarchy of images is stored as an independent executable file on the external device. The child information stored in the independent executable file causes the image to be launched when the independent executable file is selected. The external device is configured to execute a software application configured to execute the independent executable file. For example, the child hierarchy generated from the splitting is a working library that can be launched immediately. In other words, the external device is configured to execute a software application configured to execute the independent executable file. This is possible because the child hierarchy includes all of the necessary database information required to execute the software application.

Figure 11:
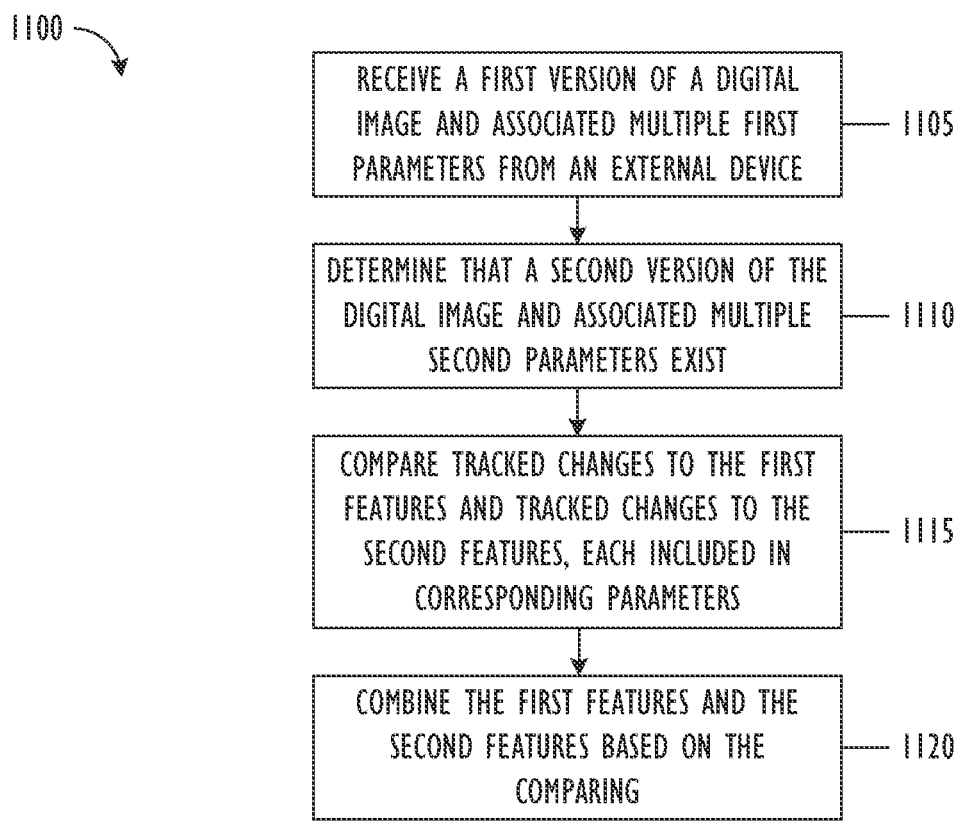
FIG. 11 is a flowchart of an example process for merging two versions of a digital image.

FIG. 11 is a flowchart of an example process 1100 for merging two versions of a digital image. The process 1100 receives, from an external device, a first version of a digital image and associated multiple first parameters at 1105. The first parameters include a collection of first features of the first version. Changes to the first features of the first version are tracked by the external device. As described previously, change tables are used to track the changes in each library. The table includes information about when objects are created, deleted, or modified. Each object that can be displayed in the user interface 135 of the display device 115, for example, each digital image, can be associated with a corresponding record in the storage unit operatively coupled to the first computing device 105. For example, "Version Table" includes information about a version of an image and features associated with the image. A corresponding change table, "VersionChange Table" tracks changes to the versions. The tracked information can be leveraged during merge operations to enable making precise decisions about the features that have been changed so that conflicts, if detected, can be resolved.

An example change table is shown below:

| modelid | chUuid | chType | chMask | chDate | chDbUuid |
|---------|--------|--------|--------|--------|----------|
| modelid | changeUuid | changeType | changeMask | changeDate | changeDbUuid |

The "modelid" column is a primary key for the change table and can be a unique identifier to use when referring to a row of the change table. The "changeUuid" column is a universally unique identifier for the object, for example, digital image, that changed. For example, a version of the digital image has been changed. The "changeType" column is an indicator of the type of change. Three types of change can occur: modification (represented by "0"), addition (represented by "1"), and deletion (represented by "2"). The "changeMask" column is a bitmask, which can be used only for modifications indicating the features of the object that were changed.

The "changeDate" column is a time stamp, for example, date/time, indicating a time when the addition, the modification, or the deletion occurred. The "changeDbUuid" column is the universally unique identifier of a computing device that made the change. When a digital image is being changed using the second computing device 130, then the "changeDbUuid" may be empty. When the changed digital image is merged with the first computing device 105, then this field can be filled with an identifier representing the second computing device 130.

As described above, the "changeMask" column is a bitmask used to identify the features that were modified in the object. Each entry in the bitmask corresponds to a specific feature that was modified. Exemplary features and the hexadecimal values that correspond to these features are listed below:

| | |
|---|---|
| VersionNameChange Mask | 0x00000001 |
| VersionFileNameChange Mask | 0x00000002 |
| VersionStackUuidChange Mask | 0x00000004 |
| VersionMasterUuidChange Mask | 0x00000008 |
| VersionRawMasterUuidChange Mask | 0x00000010 |
| VersionNonRawMasterUuidChange Mask | 0x00000020 |
| VersionProjectUuidChange Mask | 0x00000040 |
| VersionImageDateChange Mask | 0x00000080 |

The process 1100 determines that a second version of the digital image and associated multiple second parameters including a collection of second features of the second version exist at 1110. Changes to the second features of the second version have also been tracked. For example, when importing a library from the external device to a computing device from which the library was split, the computing device checks to see if the imported library was derived from the currently running library.

The process 1100 compares tracked changes to the first features and tracked changes to the second features at 1115. For example, the computing device checks to see if the two libraries have any overlapping database records. In some implementations, the tracked changes are stored as hexadecimal values, each of which represents a change to a first feature. For example, the tracked changes to the first version are stored as hexadecimal values in one or more rows. A row can include multiple hexadecimal values, each corresponding to a change to a corresponding first feature.

The process 1100 combines the first features of the first version and the second features of the second version based on the comparing at 1120. For example, if the first features in a first library and the second features in a second library do not have overlapping database entries, then the libraries are combined because there are no conflicting entries. If the two libraries do have overlapping database entries, a dialog is presented indicating a conflict, as described previously. In some scenarios, the dialog can present users with an option of either adding the new entries to the database or merging the two entries, as described previously. If the user chooses to add, then new entries are created in the database.

Figure 12:
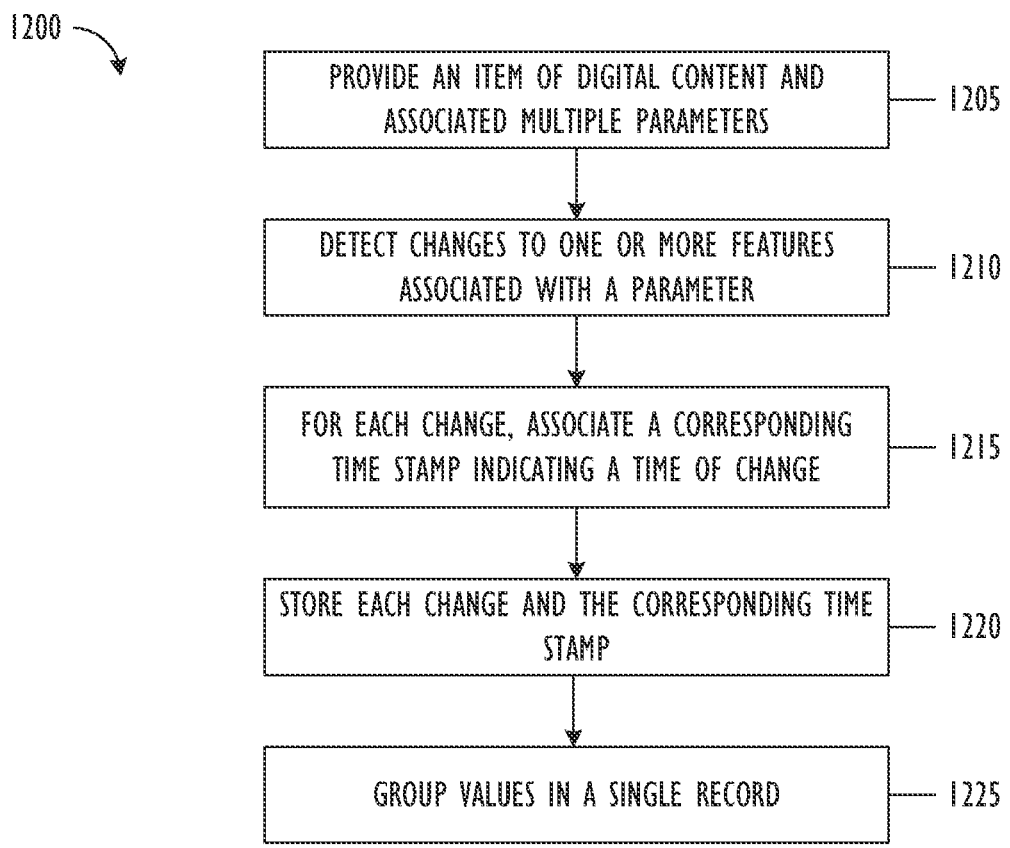
FIG. 12 is a flowchart of an example process for grouping changes based on a time span within which changes are detected.

FIG. 12 is a flowchart of an example process 1200 for grouping changes based on a time span within which changes are detected. The process 1200 provides an item of digital content and associated multiple parameters at 1205. Each parameter includes multiple features of the item. A given feature is associated with a value by which the given feature is tracked. The process 1200 detects changes to one or more features associated with a parameter at 1210. For each change to a respective feature of the one or more features, the process 1200 associates a corresponding time stamp indicating a time of change at 1215. The process 1200 stores each change and the corresponding time stamp to track the changes at 1220. The process 1200 groups in a single record, values associated with the one or more features to which changes are detected at 1225. The values are grouped based at least in part on a time span within which the changes are detected.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus.

A computer storage medium can be, or be included in, a computer-readable storage device, a computer-readable storage substrate, a random or serial access memory array or device, or a combination of one or more of them. The computer storage medium can also be, or be included in, one or more separate physical components or media (for example, multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, for example, an FPGA (field programmable gate array) or an ASIC (application specific integrated circuit). The apparatus can also include, in addition to hardware, code that creates an execution environment for the computer program in question, for example, code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (for example, one or more scripts stored in a markup language document), in a single file dedicated to the program in question, or in multiple coordinated files (for example, files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and an apparatus can also be implemented as, special purpose logic circuitry, for example, an FPGA (field programmable gate array) or an ASIC (application specific integrated circuit).

The processes and logic flows can further be implemented by one system of one or more computers to execute another system of one or more computers over one or more wired or wireless networks, such as the Internet. For example, the processes and logic flows can be encoded as one or more computer programs on computer-readable media, which are executed by the other system to perform the processes.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, for example, magnetic, magneto optical disks, or optical disks. However, a computer need not have such devices.

Devices suitable for storing computer program instructions and data include all forms of non volatile memory, media and memory devices, including by way of example semiconductor memory devices, for example, EPROM, EEPROM, and flash memory devices; magnetic disks, for example, internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, for example, a CRT (cathode ray tube) or LCD (liquid crystal display) monitor, for displaying information to the user and a keyboard and a pointing device, for example, a mouse or a trackball, by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's computing device in response to requests received from the web browser.

Embodiments of the subject matter described in this specification can be implemented in a computing system that includes a back end component, for example, as a data server, or that includes a middleware component, for example, an application server, or that includes a front end component, for example, a client computer having a graphical user interface or a Web browser through which a user can interact with an implementation of the subject matter described in this specification, or any combination of one or more such back end, middleware, or front end components. The components of the system can be interconnected by any form or medium of digital data communication, for example, a communication network. Examples of communication networks include a local area network ("LAN") and a wide area network ("WAN"), an inter-network (for example, the Internet), and peer-to-peer networks (for example, ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (for example, an HTML page) to a computing device (for example, for purposes of displaying data and receiving user input from a user interacting with the computing device). Data generated at the computing device (for example, a result of the user interaction) can be received from the computing device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A non-transitory computer-readable medium on which is stored instructions, comprising instructions that when executed by a programmable device cause the data processing apparatus to:
   receive a first version of a digital image and a first information corresponding to a plurality of changes to a first collection of features of the digital image;
   identify a second version of the digital image and a second information corresponding to a plurality of changes to a second collection of features of the digital image;
   compare the first information and the second information; and
   combine the plurality of changes to the first collection of features and the plurality of changes to the second collection of features responsive to the comparison.

2. The non-transitory computer-readable medium of claim 1,
   wherein the instructions further comprise instructions that when executed cause the programmable device to store the first information as values in one or more rows, and wherein at least one row comprises a plurality of values.

3. The non-transitory computer-readable medium of claim 2, wherein the values are in a hexadecimal format.

4. The non-transitory computer-readable medium of claim 1, wherein the instructions further comprise instructions that when executed cause the programmable device to:
   store the first version of the digital image in a hierarchical position in a master hierarchy; and
   distribute the first information across the master hierarchy.

5. The non-transitory computer-readable medium of claim 1, wherein the instructions further comprise instructions that when executed cause the programmable device to:
   receive an input to provide the first version and the first information to another programmable device;
   create the second version and the second information identical to the first version and the first information; and
   provide the second version and the second information to the another programmable device.

6. The non-transitory computer-readable medium of claim 1, wherein the instructions further comprise instructions that when executed cause the programmable device to:
   receive an input to provide the first version and the first information to another programmable device;
   provide the first version and the first information to the another programmable device responsive to the input.

7. The non-transitory computer-readable medium of claim 6, wherein the instructions that when executed cause the programmable device to provide the first version and the first information comprise instructions that when executed cause the programmable device to package the first version and the first information as an independently executable object.

8. The non-transitory computer-readable medium of claim 7, wherein the independently executable object is adapted to display the first version on a display of the another programmable device upon selection of a corresponding icon.

9. The non-transitory computer-readable medium of claim 1, wherein the first features comprise one or more of a hue, a color, and a saturation.

10. The non-transitory computer-readable medium of claim 1, wherein the instructions that when executed cause the programmable device to combine the first features and the second features comprise instructions that when executed cause the programmable device to:
    determine whether the changes to the first features are different from the changes to the second features; and
    associate the changes to the second features with the digital image responsive to the determination.

11. The non-transitory computer-readable medium of claim 10, wherein the instructions that when executed cause the programmable device to determine whether the changes to the first features are different from the changes to the second features comprise instructions that when executed cause the programmable device to:
    compare each first value associated with each first feature with each second value associated with each second feature; and
    determine that at least one first value equals at least one second value.

12. The non-transitory medium of claim 1, wherein the instructions that when executed cause the programmable device to combine the plurality of changes to the first collection of features and the plurality of changes to the second collection of features comprise instructions that when executed cause the programmable device to:
    determine that the changes to the first features conflict with the changes to the second features.

13. The non-transitory medium of claim 1, wherein the instructions that when executed cause the programmable device to combine the plurality of changes to the first collection of features and the plurality of changes to the second collection of features comprise instructions that when executed cause the programmable device to:
    determine that the changes to some of the first features conflict with the changes to some of the second features;
    determine that the changes to others of the first features are different from the changes to others of the second features; and
    associate the changes to the others of the second features with the digital image.

14. A method of consolidating changes to multiple versions of a digital image, comprising:
    receiving, by a programmable device, a first version of a digital image and a first information corresponding to a plurality of changes to a first collection of features of the digital image;

identifying a second version of the digital image and a second information corresponding to a plurality of changes to a second collection of features of the digital image;

comparing the first information and the second information; and combining, by the programmable device, the plurality of changes to the first collection of features and the plurality of changes to the second collection of features responsive to the comparing.

15. The method of claim 14, further comprising:

creating the second version and the second information from the first version and the first information; and providing the second version and the second information to another programmable device.

16. The method of claim 14, wherein comparing the first information and the second information comprises:

determining that some of the changes to some of the first features conflict with some of the changes to some of the second features.

17. A programmable device, comprising:

one or more processors; and a memory coupled to the one or more processors, on which are stored instructions that when executed cause the one or more processors to:

receive a first version of a digital image and a first information corresponding to a plurality of changes to a first collection of features of the digital image;

identify a second version of the digital image and a second information corresponding to a plurality of changes to a second collection of features of the digital image;

compare the first information and the second information; and combine the plurality of changes to the first collection of features and the plurality of changes to the second collection of features responsive to the comparison.

18. The programmable device of claim 17, wherein the instructions further comprise instructions that when executed cause the one or more processors to store the first information as values in one or more rows, and wherein at least one row comprises a plurality of values.

19. The programmable device of claim 17, wherein the instructions further comprise instructions that when executed cause the one or more processors to:

receive an input to provide the first version and the first information to another programmable device;

create the second version and the second information identical to the first version and the first information; and provide the second version and the second information to the another programmable device.

20. The programmable device of claim 17, wherein the instructions that when executed cause the one or more processors to combine the plurality of changes to the first collection of features and the plurality of changes to the second collection of features comprise instructions that when executed cause the one or more processors to:

determine that the changes to some of the first features conflict with the changes to some of the second features;

determine that the changes to others of the first features are different from the changes to others of the second features; and associate the changes to the others of the second features with the digital image.

* * * * *

UNITED STATES PATENT AND TRADEMARK OFFICE
CERTIFICATE OF CORRECTION

Page 1 of 1

PATENT NO.         : 8,832,677 B2
APPLICATION NO.    : 14/072327
DATED              : September 9, 2014
INVENTOR(S)        : Flisakowski It is certified that error appears in the above-identified patent and that said Letters Patent is hereby corrected as shown below:

In the Claims

Column 21, lines 32-33, Claim 1, replace the phrase "data processing apparatus" with --programmable device--.

Signed and Sealed this
Second Day of December, 2014

Michelle K. Lee
*Deputy Director of the United States Patent and Trademark Office*